United States Patent
Li

(10) Patent No.: US 10,012,413 B2
(45) Date of Patent: Jul. 3, 2018

(54) HEAT EXCHANGER

(71) Applicant: ECR International, Inc., Ultica, NY (US)

(72) Inventor: Hongmin Li, New Hartford, NY (US)

(73) Assignee: ECR International, Inc., Utica, NY (US)

(*) Notice: Subject to any disclaimer, the term of this patent is extended or adjusted under 35 U.S.C. 154(b) by 326 days.

(21) Appl. No.: 14/253,065

(22) Filed: Apr. 15, 2014

(65) Prior Publication Data

US 2015/0292768 A1    Oct. 15, 2015

(51) Int. Cl.
*F24H 1/16* (2006.01)
*F24H 8/00* (2006.01)
*F24H 1/43* (2006.01)
*F24H 9/00* (2006.01)

(52) U.S. Cl.
CPC ............ *F24H 8/00* (2013.01); *F24H 1/43* (2013.01); *F24H 9/0026* (2013.01); *Y02B 30/102* (2013.01)

(58) Field of Classification Search
USPC ...................................................... 122/18.4
See application file for complete search history.

(56) References Cited

U.S. PATENT DOCUMENTS

| | | | |
|---|---|---|---|
| 2,422,488 A * | 6/1947 | Andersen | F24H 1/165 122/17.2 |
| 3,477,412 A | 11/1969 | Kitrilakis | |
| 5,131,351 A * | 7/1992 | Farina | F22B 21/26 122/18.4 |
| 5,687,678 A | 11/1997 | Suchomel et al. | |
| 6,026,801 A | 2/2000 | Barkan | |
| 6,085,701 A | 7/2000 | Stauffer et al. | |
| 7,308,787 B2 | 12/2007 | LaRocque et al. | |

(Continued)

FOREIGN PATENT DOCUMENTS

DE   19529559 A1   2/1997
DE   20209753 U1   10/2002

(Continued)

OTHER PUBLICATIONS

Hamworthy, A Guide to Commercial Hot Water from Hamworthy, Feb. 19, 2014, p. 21, http://www.hamworthy-heating.com/shared/files/guide-to-commercial-hot-water-brochure-500002371H.pdf.

(Continued)

*Primary Examiner* — Alissa Tompkins
*Assistant Examiner* — John Bargero
(74) *Attorney, Agent, or Firm* — Phillips Lytle LLP; David L. Principe

(57) ABSTRACT

An improved heat exchange system comprising a housing (66) having an upper portion (22), a middle portion (23), and a lower portion (24), a heat exchange conduit (25) transmitting a fluid from a fluid input (26) to a fluid output (27) through the upper zone, the transitional zone and the lower zone, a burner (28) configured and arranged to produce combustion flue gases that can flow through at least a portion of the upper zone, the transitional zone and the lower zone, a baffle (30) disposed in the lower portion of the housing, and a gas flow diverter (40) disposed above the baffle and at least partially in the transitional zone. The gas flow diverter is configured and arranged to divert the flue gas into multiple flow paths.

18 Claims, 8 Drawing Sheets

(56) References Cited

U.S. PATENT DOCUMENTS

| | | |
|---|---|---|
| 7,523,721 B2 | 4/2009 | Hamada et al. |
| 8,343,433 B2 | 1/2013 | Conneway et al. |
| 2009/0120616 A1* | 5/2009 | Jimenez .................. F23J 15/06 165/104.19 |
| 2010/0126432 A1 | 5/2010 | Eberle et al. |
| 2011/0041781 A1 | 2/2011 | Deivasigamani et al. |
| 2011/0180234 A1 | 7/2011 | Wickham |
| 2013/0139492 A1 | 6/2013 | Wickham |

FOREIGN PATENT DOCUMENTS

| | | |
|---|---|---|
| EP | 0351247 | 1/1990 |
| EP | 1281919 A2 | 2/2003 |
| EP | 1314947 A2 | 5/2003 |
| EP | 1703227 A2 | 9/2006 |
| FR | 2514475 A1 | 4/1983 |
| GB | 950727 | 2/1964 |
| JP | 6062597 A | 4/1985 |
| WO | 1996009499 | 3/1996 |

OTHER PUBLICATIONS

The International Search Report and Written Opinion of the International Searching Authority (ISR) for International (PCT) Application No. PCT/US2015/023478; dated Feb. 9, 2016.

\* cited by examiner

HEAT EXCHANGER

TECHNICAL FIELD

The present invention relates generally to the field of heat exchangers, and more particularly to an improved coil tube heat exchanger.

BACKGROUND ART

Heat exchangers having cylindrical shells and helical tubes for heating fluid in the tubes are well known in the prior art. Generally, fluid flowing in the tubes is heated by flowing combustion gases provided by a burner located interior to the coils. U.S. Pat. No. 6,026,801 is directed to a coil heat exchanger having an interior plug. U.S. Patent Publication No. 2011/0041781 is directed to a coil tube heat exchanger having a dual-diameter outer cylindrical housing, a buffer tank within the helix coil of the heat exchanger and a rope seal disposed between adjacent coil loops of a portion of the helix coil. U.S. Pat. No. 7,523,721 is directed to a heat exchanger that includes a partition that partitions the space surrounding a coil tube into first and second regions to increase heat exchange efficiency. U.S. Pat. No. 8,343,433 is directed to a tube reactor having parallel reactor tubes.

BRIEF SUMMARY OF THE INVENTION

With parenthetical reference to corresponding parts, portions or surfaces of the disclosed embodiment, merely for the purposes of illustration and not by way of limitation, the present invention provides a heat exchange system (20) comprising a housing (66) elongated along a longitudinal axis (x-x) having an upper portion (22) defining an upper zone, a middle portion (23) defining a transitional zone, and a lower portion (24) defining a lower zone, a heat exchange conduit (25) elongated along the longitudinal axis interior to the housing and configured and arranged to transmit a fluid from a fluid input (26) to a fluid output (27) through the upper zone, the transitional zone and the lower zone, a burner (28) configured and arranged to produce combustion flue gases that can flow through at least a portion of the upper zone, the transitional zone and the lower zone, a hot flue gas flow path (35) between the upper zone and the lower zone, a baffle (30) disposed inside of the heat exchange conduit relative to the longitudinal axis and in the lower zone of the lower portion of the housing, and a gas flow diverter (40) disposed inside to the heat exchange conduit relative to the longitudinal axis and above the baffle and at least partially in the transitional zone, the gas flow diverter configured and arranged relative to the heat exchange conduit so as to divert the flue gas in the flue gas flow path into a first flow path (36) outside of the diverter relative to the longitudinal axis and a second flow path (37) at least partially separated from the first flow path by the diverter.

The heat exchange conduit may comprise a helical heat exchange tube extending between the input and the output. The helical heat exchange tube may have an inner diameter (52) between the upper and lower zones that varies by less than 20 percent, and the inner diameter of the helical heat exchange tube between the upper and lower zones may be substantially uniform.

The housing may comprise a cylindrical shell (21) and the heat exchange tube and the shell may be concentric. The baffle may comprise a cylindrical outer surface (31) and the outer surface of the baffle may be concentric with the heat exchange tube. The burner may be disposed at least partially within the upper zone of the upper portion of the housing. The burner may comprise a cylindrical outer surface (29) and the outer surface of the burner may be concentric with the heat exchange tube. The hot flue gas flow path may be inside of the heat exchange conduit relative to the longitudinal axis in the upper zone and between the heat exchange conduit and the burner in the upper zone.

The first flow path may be outside of the diverter relative to the longitudinal axis and the second flow path may be inside of the diverter relative to the longitudinal axis. The diverter may comprise an annular ring and the annular ring may be concentric with the heat exchange tube. The diverter may be integral to the baffle. The diverter may be configured and arranged so as to divide the flue gas flow path into a third flow path (138) at least partially separated from the first flow path (136) and the second flow path (137). The second flow path may be inside of the diverter relative to the longitudinal axis and the third flow path may be between the first flow path and the second flow path.

The baffle may comprise a water tank. The housing may have an inner diameter (50), the heat exchange tube may have an outer diameter (51) and the outer diameter of the heat exchange tube may be substantially equal to the inner diameter of the housing. The burner may be located exterior to the housing. The gas flow diverter may comprise a porous media. The upper zone may be configured to provide radiant heat transfer and convective heat transfer to a fluid flowing in the heat exchange conduit, wherein the heat exchange conduit, the baffle, the gas flow diverter and the housing are configured and arranged to provide a gas flow through the transition zone such that heat transfer to the fluid in the heat exchange conduit maintains the fluid at a temperature that is below the fluids boiling point, and the lower zone is configured to provide convective heat transfer to the fluid flowing in the heat exchange conduit.

DETAILED DESCRIPTION OF THE PREFERRED EMBODIMENTS

Figure 1:
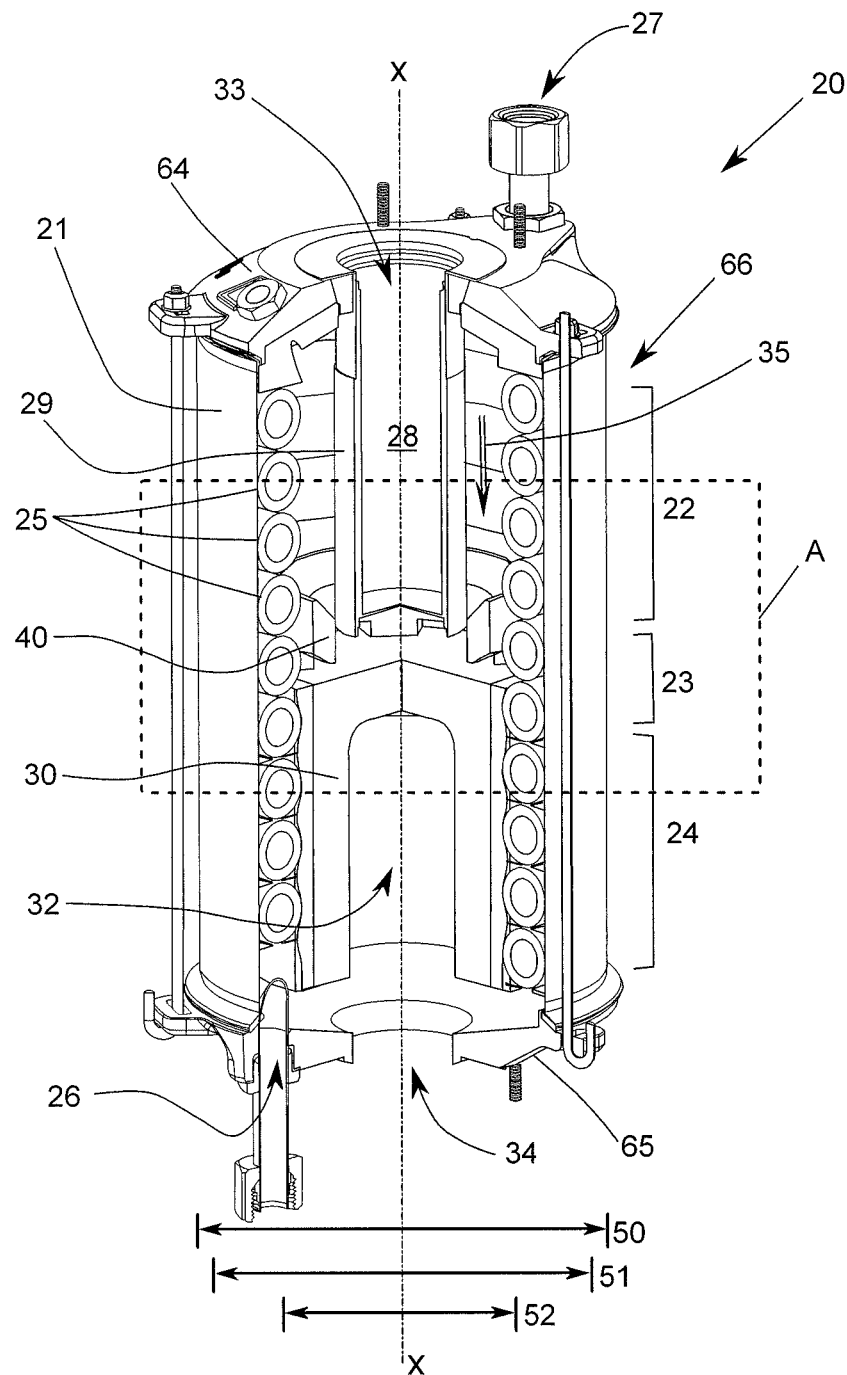
FIG. 1 is a perspective and partial cut-away view of an embodiment of an improved heat exchanger.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, an improved heat exchange system is provided, of which an embodiment is generally indicated at 20. Heat exchanger 20 is shown as broadly including housing 66, having a generally cylindrical outer shell 21 orientated about central vertical axis x-x, helical coiled tube 25 concentric with shell 21, upper premix burner 28 concentric with shell 21, and lower baffle 30 concentric with shell 21.

As shown, housing 66 includes a single diameter can or shell 21 having upper portion 22, middle portion 23 and lower portion 24. The inner diameter 50 of shell 21 is uniform through upper, middle and lower portions 22, 23 and 24. Alternatively, the inner diameter 50 of shell 21 may vary by less than 20% through upper, middle and lower portions 22, 23 and 24. Top cap 64 of housing 66 includes upper fuel inlet 33 and bottom cap 65 of housing 66 includes lower flue gas outlet 34.

Housing 66 contains a helical coiled tube 25 elongated along axis x-x. Tube 25 extends from bottom water inlet 26 to top water outlet 27 and is generally concentric with shell 21. In use, water is received through inlet 26 and is moved through coiled tube 25 and out through output 27.

A radial fire burner 28 and cylindrical baffle 30 are disposed axially and concentrically within shell 21 and inside the lumen of helical coiled tube 25. One or more igniters are located in close proximity to burner 28 for the purpose of igniting an air-fuel mixture that is received in burner 28 through inlet 33. Baffle 30 is positioned in the lower portion 24 of shell 21 and is disposed radially inside of coiled tube 25. Baffle 30 comprises outer surface 31 and top 60, which define inner hollow pocket 32. Inner hollow pocket 32 may be open to flue gas, but does not communicate with water flowing through the coil.

In use, the coil-turns of helical tube 25 in the upper zone receive radiation heat from combustion flame of burner 28.

In use, fuel air mixture is provided to the combustion chamber of burner 28 through inlet 33. Hot flue gas, generated in the combustion chamber of burner 28, flows down through the upper zone in flow path 35. In the lower zone, the flue gas passes by the coil-turns around center cylindrical baffle 30 and exits heat exchanger 20 through flue gas outlet 34. Water flows in the opposite direction upward from inlet 26, through coil tubes 25 and then out through output 27. Heat, received by coil tube 25 from flue gas, is transferred to the water flowing inside coil tube 25. Thus, cold water flows in at the bottom end of coil tube 25, is heated, and then exits the top end of coil tube 25. Thus, the overall flow direction of water is upward and the overall flow direction of hot gas is downward, which establishes a counter-flow heat transfer process. The water inside coil tube 25 receives heat when flowing through each coil-turn and its temperature is elevated as it receives such heat. The coil-turns around burner 28 generally receive radiation heat from surface 29 of burner 28 and from combustion flames. Some convection heat transfer exists but at a lower heat flow rate, due to the low local flue gas flow velocity around these coil-turns in the upper zone. In the coil-turns in the lower zone around center cylindrical baffle 30, heat is transferred primarily through convection, with or without condensation.

Figure 2:
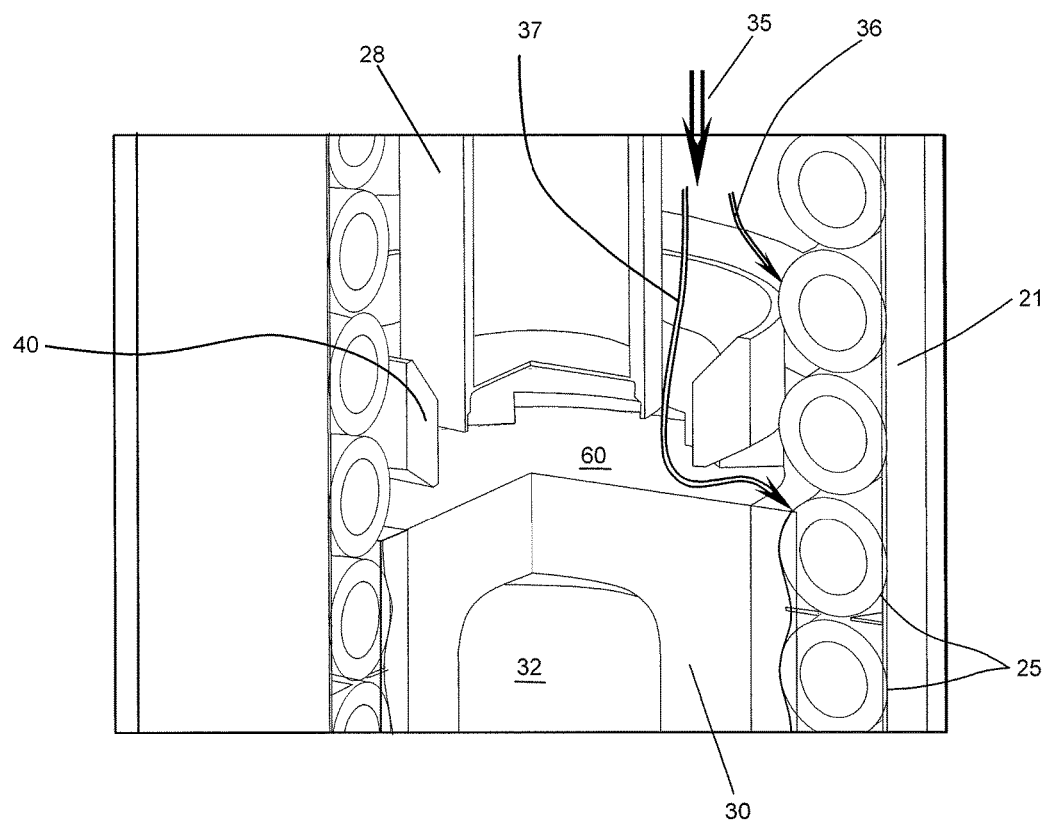
FIG. 2 is an enlarged view of the heat exchanger shown in FIG. 1, taken within the indicated area A of FIG. 1.
Figure 3:
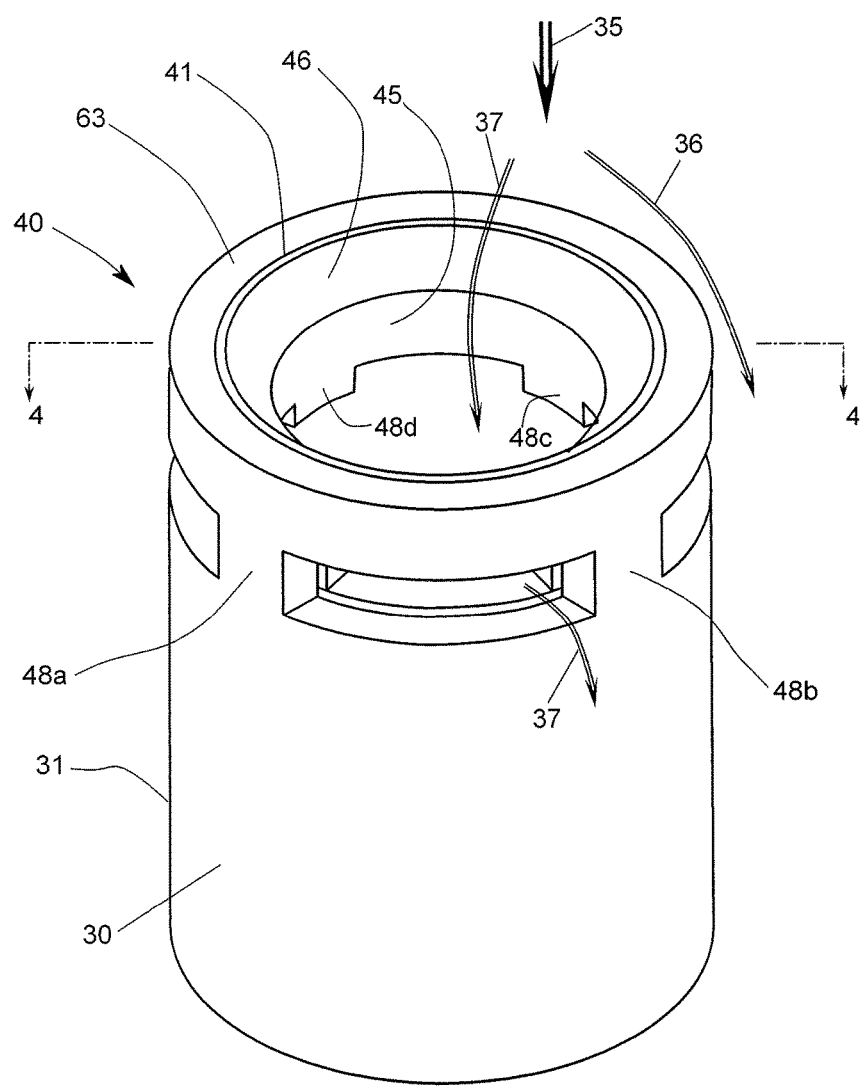
FIG. 3 is a perspective view of the diverter ring and baffle shown in FIG. 1.
Figure 4:
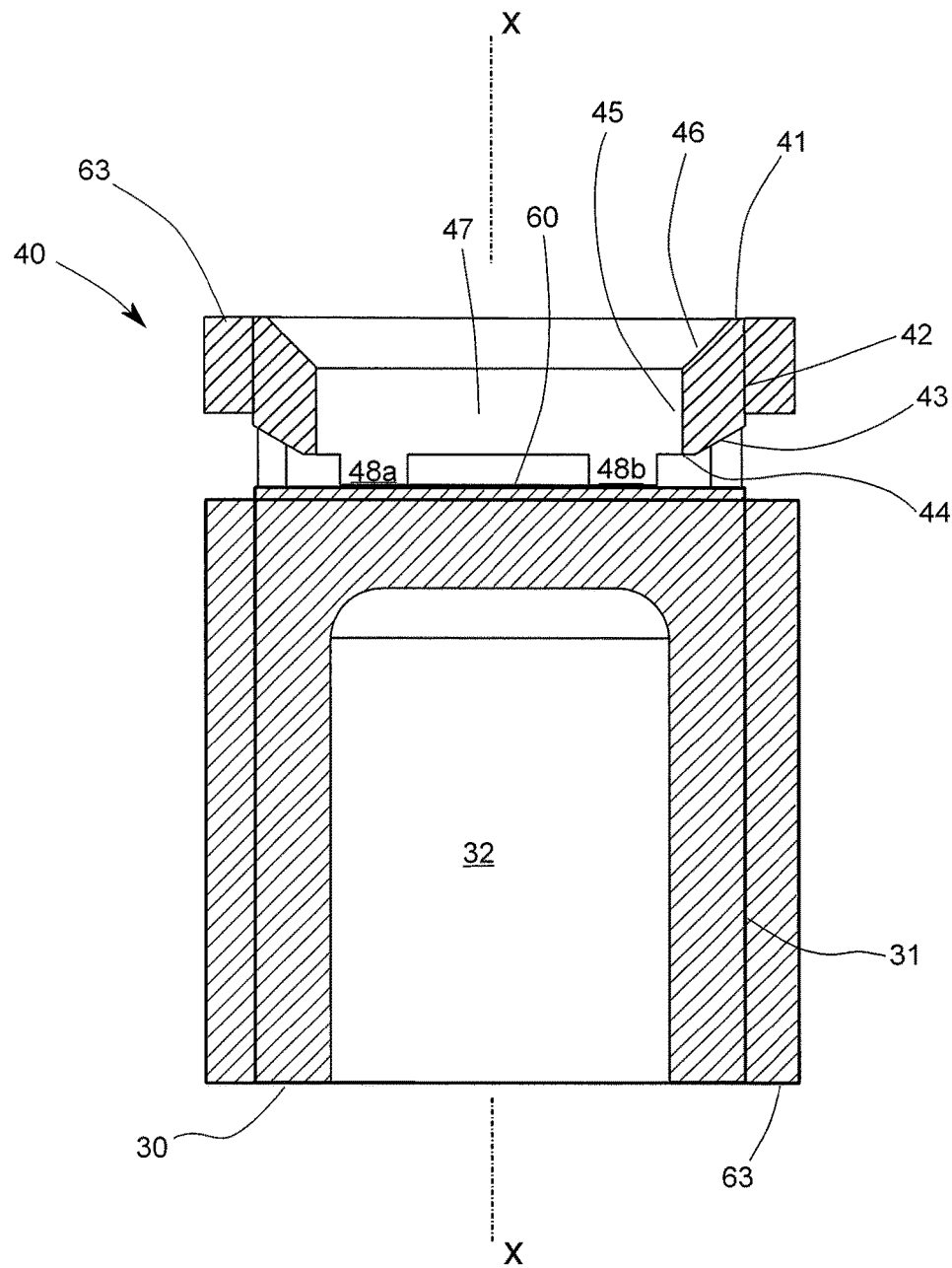
FIG. 4 is a vertical cross-sectional view of the diverter ring and plug shown in FIG. 3, taken generally on line 4-4 of FIG. 3.

As shown in FIGS. 1-5, a specially configured heat transfer load reducing ring, or diverter ring, 40 is disposed slightly above top surface 60 of baffle 30 of heat exchanger 20 and inside the lumen of coiled tube 25. Diverter ring 40 is thus disposed to the inside of coiled tube 25 relative to axis x-x. As shown in FIG. 4, heat transfer reducing ring 40 is generally a cylindrical ring-shaped annular structure elongated along axis x-x, and is bounded by upwardly-facing annual horizontal surface 41, outwardly-facing vertical cylindrical surface 42, downwardly and outwardly-face frusto-conical surface 43, downwardly-facing annual horizontal surface 44, inwardly-facing vertical cylindrical surface 45, and upwardly and inwardly-facing frusto-conical surface 46, joined at its outer marginal end to the inner marginal end of surface 41. Surfaces 46 and 45 generally define axial through-way 47.

As shown in FIGS. 3 and 4, diverter ring 40 is supported on top surface 60 of baffle 30 by four circumferentially spaced legs or posts 48a-d. Posts 48a-d extend from top surface 60 of baffle 30 to provide an annular space between top surface 60 of baffle 30 and bottom surface 44 of diverter ring 40. In this embodiment, diverter ring 40 and baffle 30 are formed integrally from the same material. However, it is contemplated that diverter ring 40 may be an entirely separately formed element that is supported above baffle 30 in the transitional zone of heat exchanger 20 by alternate means.

As shown in FIGS. 3 and 4, an outer layer of insulation 63 is provided on outer surface 42 of diverter ring 40, outer surface 31 of baffle 30, and the outer surfaces of support legs 48a-d. In this embodiment, insulation covering 63 on the outer surfaces of baffle 30 and ring 40 is a ceramic fiber blanket.

As shown in FIG. 2, heat load reducing ring 40 generally separates or spreads the hot flue gas flowing from the upper zone in flue gas flow path 35 into two paths 36 and 37 in the transition zone. In particular, part 36 of the hot flue gases in path 35 flows over top surface 41 of ring 40 and radially outwardly of diverter ring 40 and hits coil-turns C and B of tube 25. As described further below, after passing by coil-turns C and B, the flue gas in this flow path 36 is already cooled down. Part 37 of hot flue gases in flow path 35 flows inside of surfaces 46 and 44 and below surface 44 of diverter ring 40 and is combined with the cooled flue gases in flow path 36 and hits coil-turn A of tube 25. Thus, flow path 37 passes by inside surface 45 relative to axis x-x and through the gaps between posts 48a-d, bottom surface 44 of diverter ring 40 and top surface 60 of baffle 30. The again combined hot flue gases are then forced by surface 31 of baffle 30 to flow by the lower coil-turns of tube 25 in the lower zone one-by-one.

Figure 5:
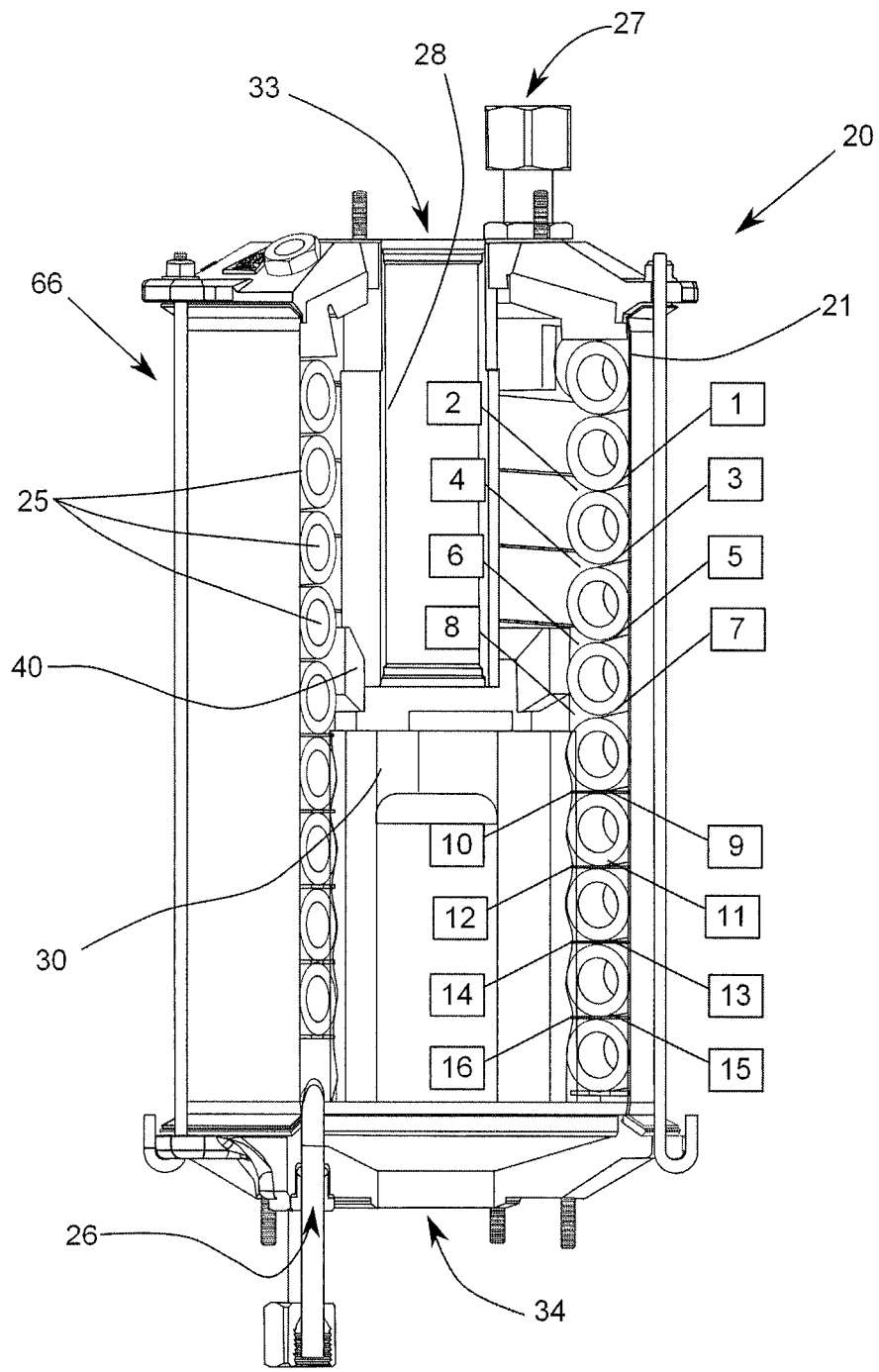
FIG. 5 is a perspective and partial cut-away of the heat exchanger shown in FIG. 1 showing positions for temperature readings.

A number of unexpected beneficial results are achieved with heat transfer load reducing ring 40. In particular, coil-turns C and B, on the outside of diverter ring 40 relative to axis x-x, receive the hottest flue gases but only with respect to part of the total mass flow of flue gases in flow path 35. Coil-turn A, below heat transfer reducing ring 40, received the total amount of flue gas but at a lower temperature. Thus, the concentrated heat transfer load of flue gases in flow path 35 was spread onto multiple coil-turns of tube 25 in this transitional zone by diverter ring 40. In particular, and with reference to FIG. 5 and the Table 1 below, flue gas temperatures were measured in heat exchanger 20 and compared to a similarly configured heat exchanger which did not include diverter ring 40. The locations of temperature readings in these respective test heat exchangers are indicated in FIG. 5. Essentially, these measurements were taken on the inside and outside of each coil-turn of tube 25. Location references from FIG. 5 are set forth in columns 1 and 2. Temperatures taken with heat exchanger 20 having diverter ring 40 at references 1-16 are shown in columns 3 and 4, respectively. Temperature readings at such locations for a heat exchanger without diverter ring 40 are shown in column 5 and 6, respectively. The temperatures in flue collector outlet 34 were also taken and are shown in Table 1 below.

TABLE 1

| Location of Temperature Measurement | | Including Heat Load Reducing Ring | | Not Including Heat Load Reducing Ring | |
|---|---|---|---|---|---|
| Inside of Coil | Outside of Coil | Inside of Coil | Outside of Coil | Inside of Coil | Outside of Coil |
| 2 | 1 | 1651 | 535 | 1527 | 480 |
| 4 | 3 | 1745 | 555 | 1642 | 370 |
| 6 | 5 | 1551 | 615 | 1720 | 349 |
| 8 | 7 | 1087 | 485 | 1769 | 315 |
| 10 | 9 | 656 | 276 | 982 | 430 |
| 12 | 11 | 272 | 214 | 291 | 221 |
| 14 | 13 | 202 | 161 | 211 | 175 |
| 16 | 15 | 155 | 152 | 161 | 147 |
| Temperature in Flue Collector | | 130 | | 133 | |

As shown above, the temperature variation around the coil-turns indicates that the heat transfer load on coil-turn B and all the coil-turns above coil-turn B, is low. Coil-turn A has a very high transfer load. It cools the flue gas from about 1760° F. down to about 982° F. Considering the total flue gas temperature drop is about 1760° F. to 133° F. across the whole heat exchanger and assuming 15% of total heat is latent heat, due to the condensing of water vapor in the flue gas, 40% of the total heat transfer load of the whole heat exchanger is on coil A. By adding diverter ring 40, it was found that a much more even heat transfer load is applied to these coil turns. Part of the hottest flue gas (for example 50 percent of the total flue gas) at 1745° F. hit coil-turns C and B. After it is cooled, this flow 36 mixed with the flue gas flowing through second flow path 37 (at 1745° F.) and reached a mix temperature of about 1087° F. Then the total amount of flue gas at 1087° F. hit coil-turn A. Coil-turn A cooled it down to 716° F. Again, assuming 15% of the total heat is latent heat, the heat transfer load on coils C, B and A were about 16%, 14% and 18%, respectively, of the total heat exchanger heat transfer load. Comparing the heat transfer load distribution for heat exchanger 20 compared to a heat exchanger without diverter ring 40, diverter ring 40 successfully spread the concentrated heat transfer load onto these three critical coil-turns.

In addition, heat transfer load reducing ring 40 provided benefits with respect to boiling noise. Considering a 100 MBH boiler, the design water flow rate through the heat exchanger is 8 gallons per minute. The corresponding temperature differential across the heat exchanger is 20° F. when the boiler runs on full fire. On boilers without diverter ring 40, it was observed that when the temperature differential across the heat exchanger reached 26° F., boiling noises started. In other words, when the water flow rate was reduced to 6 gallons per minute, boiling started. Boiling noise came from the coil-turn at the top surface 60 of baffle 30. By adding diverter ring 40, surprising results occurred. The heat exchanger water flow rate was reduced down to 2 gallons per minute. The corresponding temperature differential across the heat exchanger was more than 80° F. No boiling noises were identified. The test was conducted with 100 percent antifreeze solution and the heating system had zero gauge pressure on its fluid. Thus, diverter ring 40 eliminated locate concentrated heat transfer loads. The hot gas flow in each of paths 36 and 37 may be 10% to 90% of the total hot gas flow.

Figure 6:
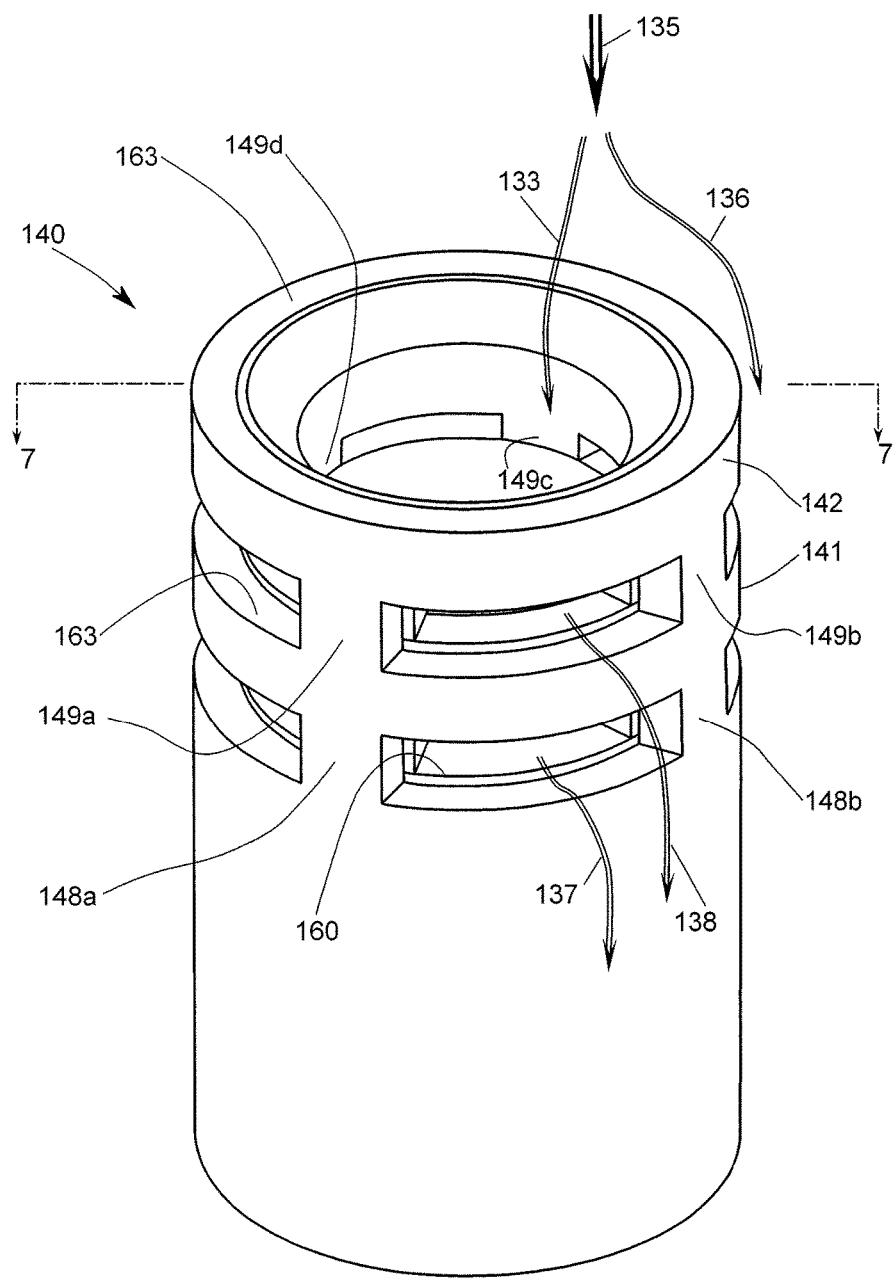
FIG. 6 is a perspective view of an alternative embodiment of the diverter ring and baffle shown in FIG. 1.
Figure 7:
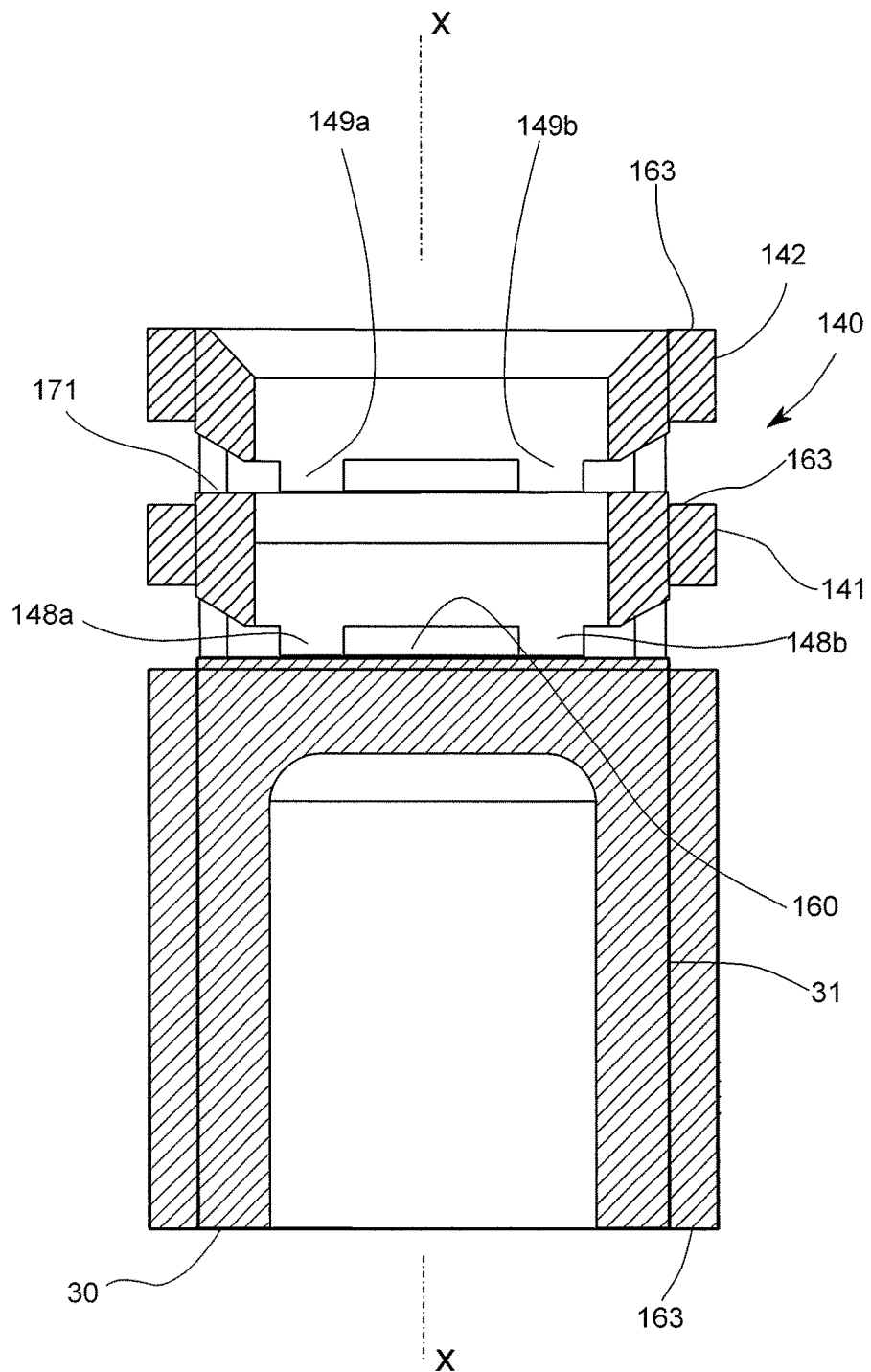
FIG. 7 is a vertical cross-sectional view of the ring and baffle shown in FIG. 6, taken generally on line 7-7 of FIG. 6.

FIGS. 6 and 7 show a second embodiment 140 of a heat transfer load reducing ring. Gas flow diverter 140 comprises two ring members 141 and 142, each having the same configuration as diverter ring 40. As shown, the combination of baffle 30 and lower diverter ring 141 is the same as shown in FIG. 4. Diverter ring 141 is supported on top surface 160 of baffle 30 by four integral posts 148a-d. However, in this embodiment, a second diverter ring having a configuration the same as diverter ring 40 is further provided on top of intermediate ring 141. As shown, upper diverter ring 142 is supported on top of lower diverter ring 141 by for posts 149a-149d that are supported by and formed integrally with upwardly-facing annular horizontal surface 171 of lower diverter ring 141. As shown, an outer layer of insulation 163 is provided on the outer surfaces of the baffle, rings and posts.

With this embodiment, flue gas in flow path 135 is further dispersed and spread relative to the associated coil-turns of helical tube 25. With reference to FIG. 6, flow path 135 is initially separated by the top of upper ring 142 into flow path 136 and flow path 133. Part 136 of the hot flue gases in path 135 flows over the top surface of upper ring 142 and radially outwardly of diverter ring 142. Part 133 of hot flue gases in flow path 135 flows inside of upper ring 142 relative to axis x-x. Part 133 of hot flue gases is further separated into flow paths 137 and 138. Flow path 138 passes through the gaps between posts 149a-d before recombining with flow path 136 outwardly of diverter ring 140 relative to axis x-x. The remaining part 137 of flue gases 133 flows inside of lower ring 141 relative to axis x-x and through the gaps between posts 148a-d before recombining with flow path 136 outwardly of diverter ring 140 relative to axis x-x. The again combined hot flue gases are then forced by surface 31 of baffle 30 to flow by the lower coil-turns of tube 25 in the lower zone one-by-one. It is contemplated that multiple other configurations may be used to spread or divide the flue gas in the flue gas path across multiple coil-turns. For example, a diverter ring with a higher number of flow channels may be employed or the diverter ring may comprise a porous media material defining many numerous flow paths that disperse or spread the flue gas.

Figure 8:
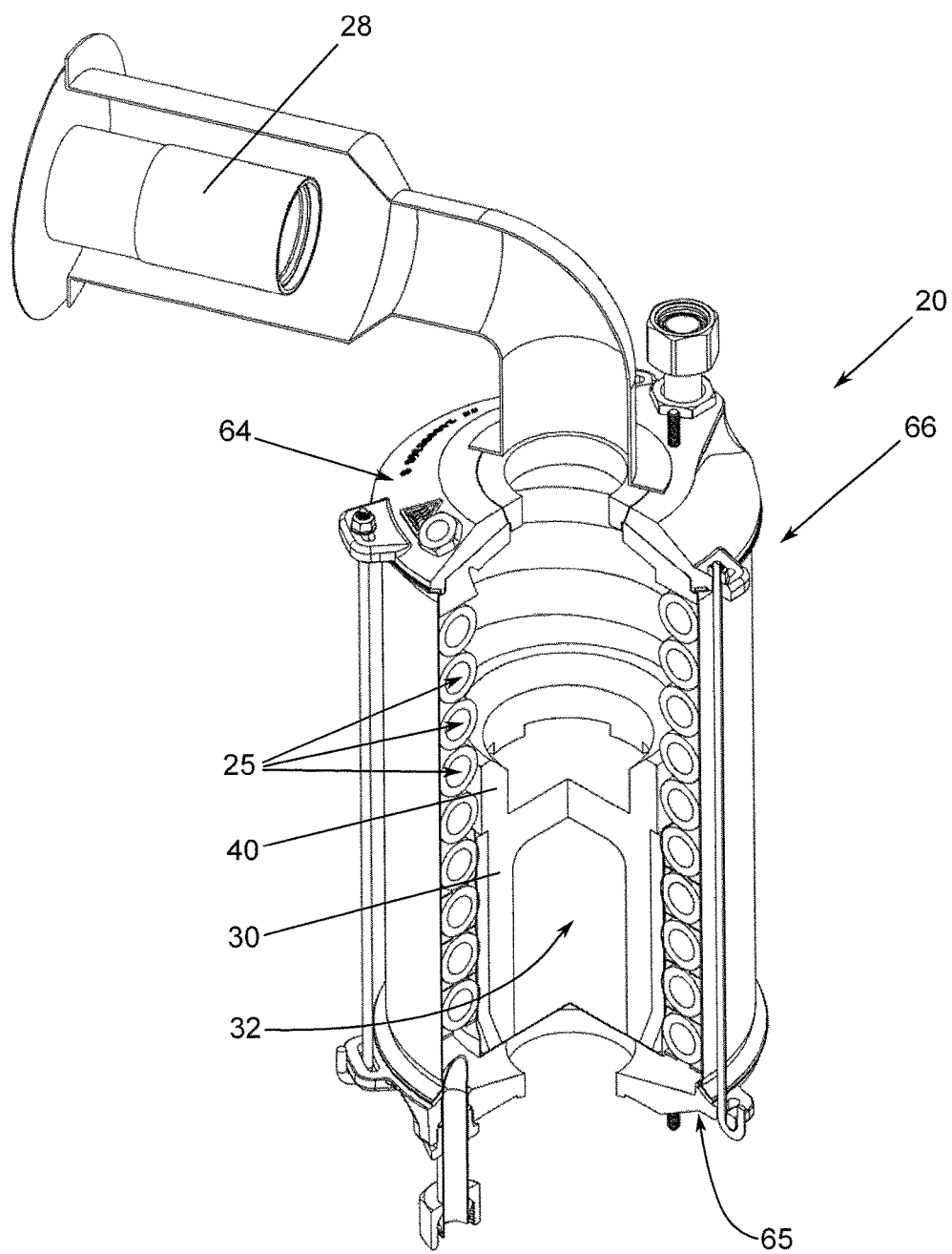
FIG. 8 is a perspective and partial cutaway view of an alternate embodiment of the improved heat exchanger.

Diverting ring 40 may be made of metal or non-metal material. Coil 25 may be a smooth tube coil or may be a tube with extended surfaces such as a finned coil. Burner 28 may be external to housing 20 (FIG. 8). For example an outside burner may be used to generate hot gas that is then transferred inside housing 65. Baffle 30 may be formed of metal or non-metal material. In addition, baffle 30 may include a heat exchanger component such as a water tank. The heat exchanger may or may not employ additional flow guiding baffles on the coils.

The present invention contemplates that many changes and modifications may be made. Therefore, while the presently-preferred form of the improved heat exchanger has been shown and described, and a number of alternatives discussed, persons skilled in this art will readily appreciate that various additional changes and modifications may be made without departing from the spirit of the invention, as defined and differentiated by the following claims.

What is claimed is:

1. A heat exchange system comprising:
a housing elongated along a longitudinal axis and having an upper portion defining an upper zone, a middle portion defining a transitional zone, and a lower portion defining a lower zone;
a heat exchange conduit elongated along said longitudinal axis interior to said housing and configured and arranged to transmit a fluid from a fluid input to a fluid output through said upper zone, said transitional zone and said lower zone, the heat exchange conduit comprises a helical heat exchange tube extending between said input and said output;
a burner configured and arranged to produce combustion flue gases that can flow through at least a portion of said upper zone, said transitional zone and said lower zone;
a hot flue gas flow path between said upper zone and said lower zone;
a baffle disposed inside of said heat exchange conduit relative to said longitudinal axis in said lower zone of said lower portion of said housing, said baffle comprises a cylindrical outer surface and said outer surface of said baffle is concentric with said heat exchange tube;
a generally ring-shaped gas flow diverter disposed in spaced apart relation to a top surface of the baffle to form circumferential openings providing pathways for gas flow, the gas flow diverter disposed inside of said helical heat exchange tube relative to said longitudinal axis and above said baffle at least partially in said transitional zone, the gas flow diverter having an upwardly facing surface and a bottom surface, said gas flow diverter configured and arranged relative to said heat exchange conduit so as to divert said flue gases in said flue gas flow path into a first flow path across the upwardly facing surface and outside of said diverter relative to said longitudinal axis and a second flow path inside the gas flower diverter and through the space between the bottom surface of the gas flow diverter and the top surface of the baffle, the second flow path at least partially separated from said first flow path by said diverter;
wherein the gas flow diverter is disposed adjacent to the top surface of the baffle;
wherein said housing comprises a cylindrical shell and said heat exchange tube and said shell are concentric and,
wherein the gas flows between the upper zone and lower zone in the opposite direction of the heat exchange fluid.

2. The heat exchange system set forth in claim 1, wherein said helical heat exchange tube has an inner diameter between said upper and lower zones that varies by less than twenty percent.

3. The heat exchange system set forth in claim 2, wherein said inner diameter of said helical heat exchange tube between said upper and lower zones is substantially uniform.

4. The heat exchange system set forth in claim 1, wherein said burner is disposed at least partially within said upper zone of said upper portion of said housing.

5. The heat exchange system set forth in claim 4, wherein said burner comprises a cylindrical outer surface and said outer surface of said burner is concentric with said heat exchange tube.

6. The heat exchange system set forth in claim 1, wherein said hot flue gas flow path between said upper zone and said lower zone is inside of said heat exchange conduit relative to said longitudinal axis in said upper zone and between said heat exchange conduit and said burner in said upper zone.

7. The heat exchange system set forth in claim 1, wherein said diverter comprises an annular ring and said annular ring is concentric with said heat exchange tube.

8. The heat exchange system set forth in claim 1, wherein said diverter is integral to said baffle.

9. The heat exchange system set forth in claim 1, wherein said diverter is configured and arranged so as to divide said flue gas flow path into a third flow path at least partially separated from said first flow path and said second flow path.

10. The heat exchange system set forth in claim 9, wherein said second flow path is inside of said diverter relative to said longitudinal axis and said third flow path is between said first flow path and said second flow path.

11. The heat exchange system set forth in claim 1, wherein said baffle comprises a water tank.

12. The heat exchange system set forth in claim 1, wherein said housing has an inner diameter, said heat exchange tube has an outer diameter and said outer diameter of said heat exchange tube is substantially equal to said inner diameter of said housing.

13. The heat exchange system set forth in claim 1, wherein said burner is located exterior to said housing.

14. The heat exchange system set forth in claim 1, wherein said gas flow diverter comprises a porous media.

15. The heat exchange system set forth in claim 1, wherein said upper zone is configured to provide radiant heat transfer and convective heat transfer to a fluid flowing in said heat exchange conduit, wherein said heat exchange conduit, said baffle, said gas flow diverter and said housing are configured and arranged to provide a gas flow through said transition zone such that heat transfer to said fluid in said heat exchange conduit maintains said fluid at a temperature that is below said fluid's boiling point, and said lower zone is configured to provide convective heat transfer to said fluid flowing in said heat exchange conduit.

16. The heat exchange system set forth in claim 1, wherein the gas flow diverter is supported by at least one post.

17. The heat exchange system set forth in claim 16, wherein the at least one post further comprises a plurality of circumferentially spaced posts.

18. The heat exchange system set forth in claim 16, wherein the gas flow diverter, the at least one post and the baffle are integrally formed.

* * * * *